Z. M. BEALL.
Subsoil-Plow.
No 32,459.
Patented June 4, 1861.
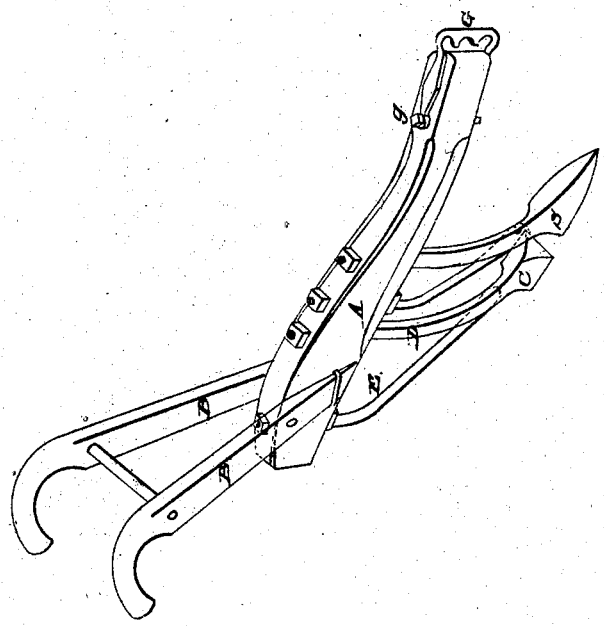

UNITED STATES PATENT OFFICE.

ZADOK M. BEALL, OF RUSSELLVILLE, KENTUCKY.

IMPROVEMENT IN PLOWS.

Specification forming part of Letters Patent No. 32,459, dated June 4, 1861.

*To all whom it may concern:*

Be it known that I, ZADOK M. BEALL, of Russellville, in the county of Logan and State of Kentucky, have invented a new and useful Improvement in Plows; and I do hereby declare that the following is a full, clear, and exact description of the same, reference being had to the accompanying drawing, making part of this specification, and being a perspective view of my said improvement.

To enable others skilled in the art to make and use my invention, I will proceed to describe its construction and operation.

A represents the draft-beam; B B, handles attached thereto in the usual manner.

C is a cutter of rectangular form, provided with a curved shank, D, which passes through the draft-beam, and is secured thereto by a nut on its upper side.

E is a brace, also secured in the draft-beam, and bolted at its lower end to the back part of the cutter. The cutter occupies the same position relatively to the draft-beam that an ordinary plow does. In front of the cutter, and secured to the draft-beam and braced in precisely the same manner, is a plowshare, S, which, on its upper side, is made in the form of a spear and concave on its under side. The plow projects some distance below the edge of the cutter, and is intended, when in operation, to be buried in the earth sufficiently to allow the edge of the cutter to graze the surface of the ground.

G is a clevis attached to the forward end of the draft-beam by a king-bolt, g. As the plow is drawn through the ground, it passes under the roots and brings them near the surface, when the cutter following immediately behind severs them from the bushes, and leaves them in a condition to be gathered with but little trouble.

When the plow is desired to be used without the cutter for common plowing, it can be by simply removing the cutter and placing the plow in its place.

What I claim as new and of my invention herein, and desire to secure by Letters Patent, is—

The arrangement of the cutter C, shank D, brace E, plowshare S, beam A, and handles B B, the whole being constructed and combined and operating in the manner and for the purposes herein shown and explained.

ZADOK $\overset{\text{his}}{\times}$ M. BEALL.
mark.

Witnesses:
JOS. M. BEALL,
JOHN B. WALTON.